June 30, 1942. H. F. SMITH 2,288,114
REFRIGERATING APPARATUS
Filed Nov. 25, 1938 6 Sheets-Sheet 1

INVENTOR.
Harry F. Smith
BY Spencer, Hardman & Fehr.
ATTORNEYS.

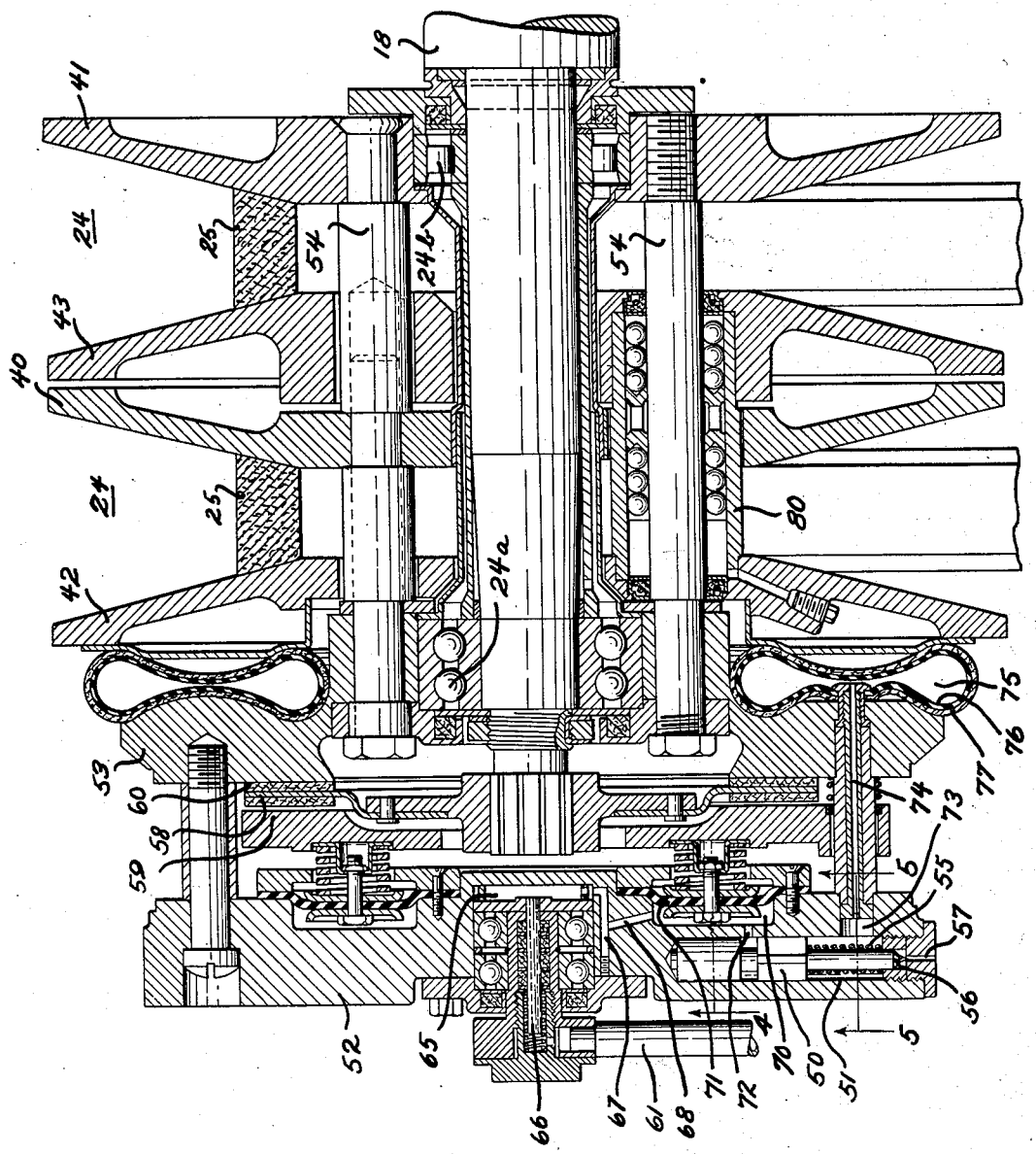

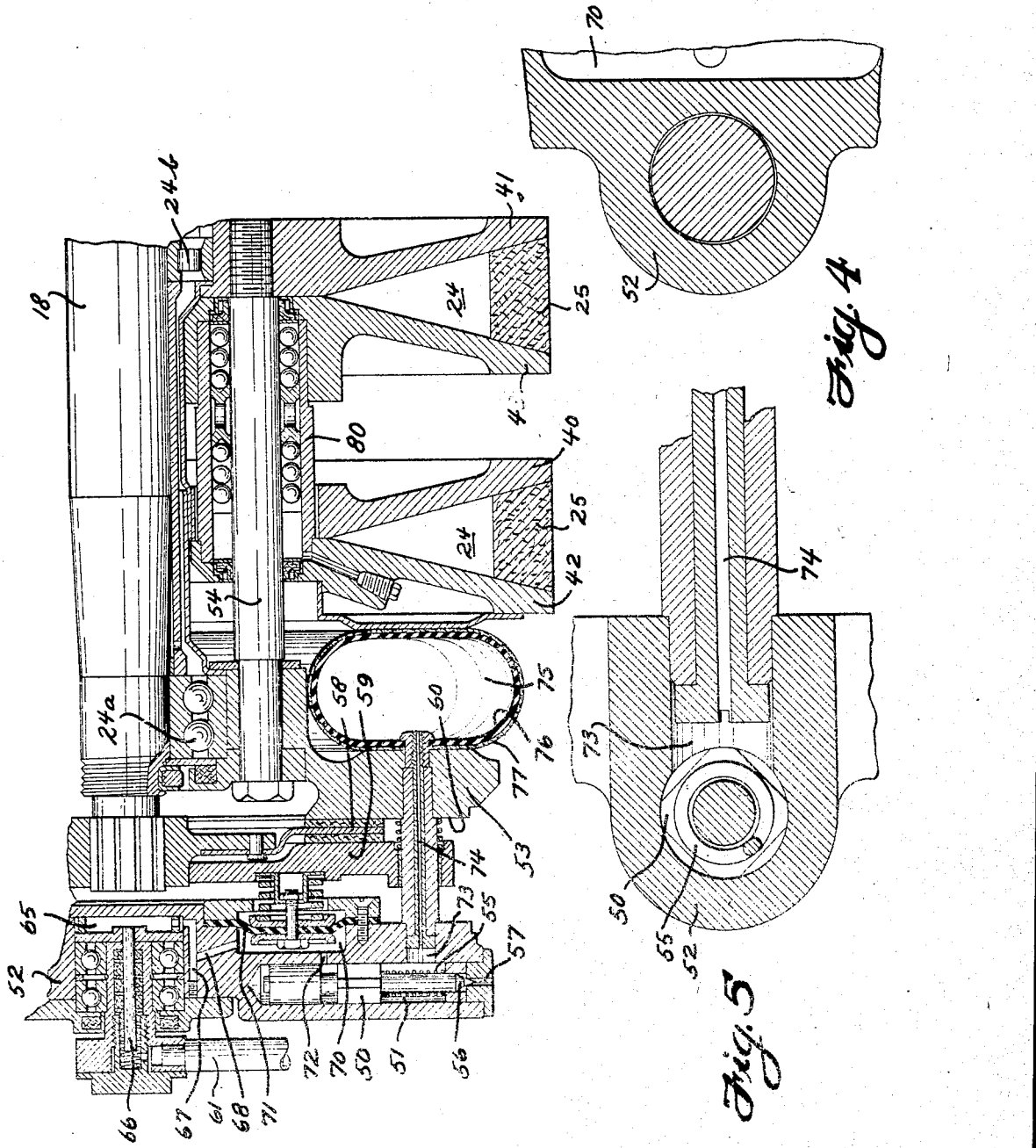

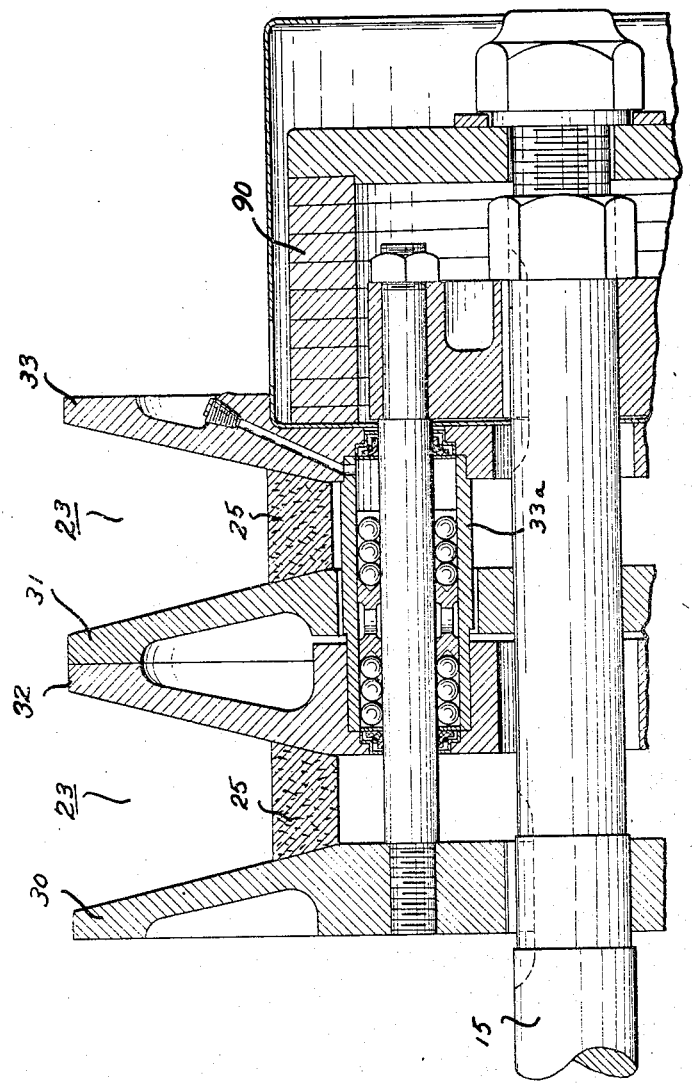

June 30, 1942.    H. F. SMITH    2,288,114

REFRIGERATING APPARATUS

Filed Nov. 25, 1938    6 Sheets-Sheet 6

INVENTOR.
Harry F. Smith
BY Spencer, Hardman & Fehr
ATTORNEYS.

Patented June 30, 1942

2,288,114

UNITED STATES PATENT OFFICE 2,288,114

REFRIGERATING APPARATUS

Harry F. Smith, Lexington, Ohio, assignor to General Motors Corporation, Dayton, Ohio, a corporation of Delaware Application November 25, 1938, Serial No. 242,212

1 Claim. (Cl. 74—230.17)

This invention relates to refrigeration and more particularly to refrigerating apparatus for conditioning air in vehicles and the like.

It is an object of this invention to provide an improved speed responsive actuating mechanism for controlling a variable ratio drive.

Further objects and advantages of the present invention will be apparent from the following description, reference being had to the accompanying drawings, wherein a preferred form of the present invention is clearly shown.

In the drawings:

Fig. 2 is a cross sectional view of the driven pulley portion of the variable ratio drive;

Fig. 3 is a fragmentary sectional view of the driven pulley portion of the variable ratio drive showing the pneumatic operator fully deflated;

Fig. 4 is a fragmentary sectional view taken on line 4—4 of Fig. 2;

Fig. 5 is a fragmentary sectional view taken on line 5—5 of Fig. 2;

Fig. 7 is a fragmentary sectional view showing the driving member of the variable ratio drive in another position;

Figure 1:
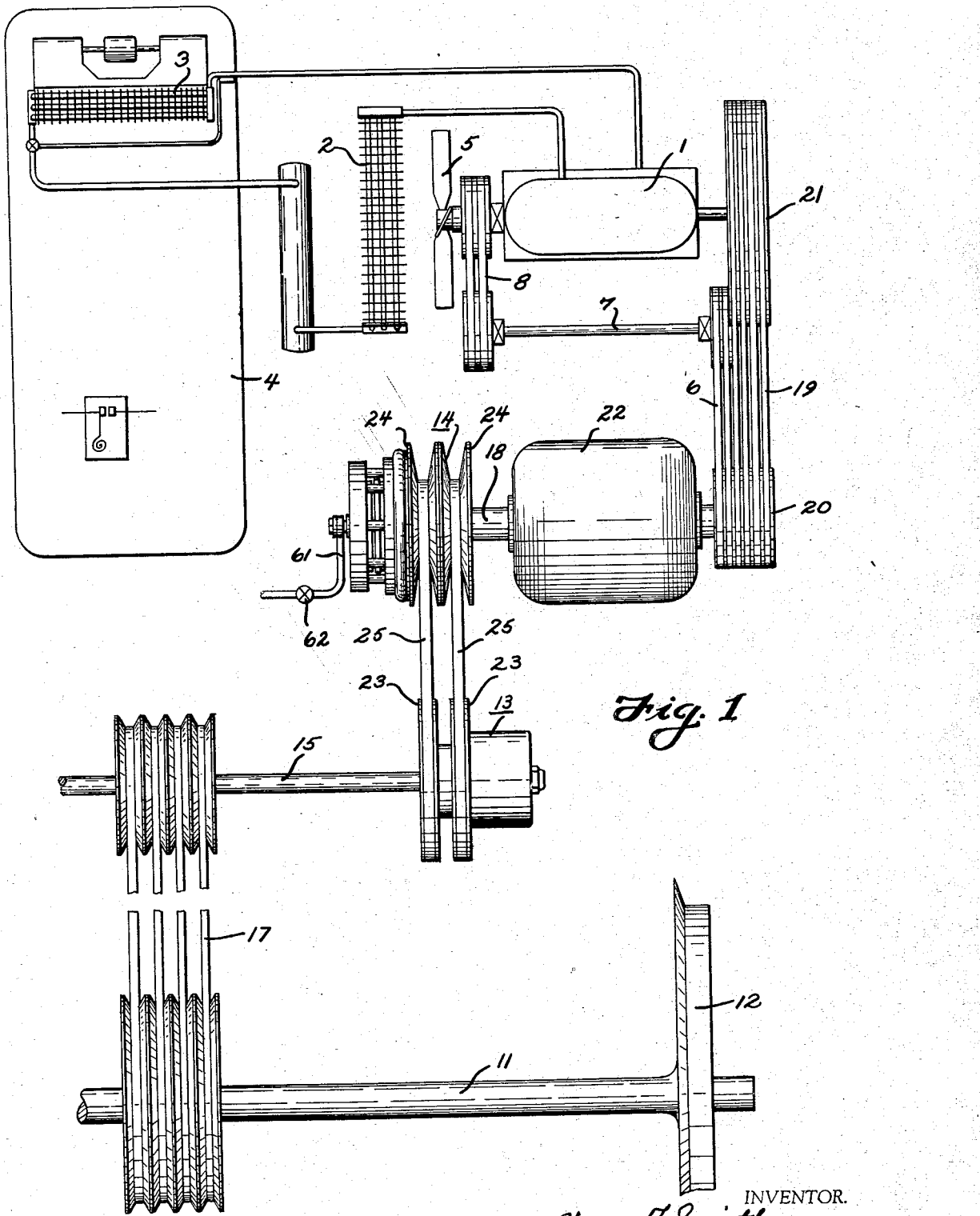
Fig. 1 is a plan view somewhat diagrammatic of a portion of an apparatus embodying features of the invention.

In accordance with this invention, a vehicle is provided with a variable ratio drive by which an apparatus such as a compressor 1 of an air conditioning system is driven at desired or permissible speeds, notwithstanding the variations in the speed of travel of the vehicle. The compressor 1 discharges compressed refrigerant into the condenser 2. The condensed refrigerant is evaporated in the evaporator 3 located in the vehicle 4. Preferably the variable ratio drive is interposed between the compressor and some rotating part of the vehicle 4 which rotates in direct proportion to the speed of the vehicle. For example, the rotating part may be an axle 11 which carries a wheel 12 of the vehicle. The axle 11 actuates the driver portion 13 of the variable ratio drive which in turn drives the driven portion 14 of the variable ratio drive from whence the power is transmitted by suitable instrumentalities to the compressor 1.

When this invention is applied to a railway car or the like, the axle 11 is preferably caused to drive a jackshaft 15 floatingly mounted on the vehicle by any suitable means. The drive between the axle 11 and the shaft 15 preferably takes the form of a multiple belt 17 which drives the jackshaft 15 at a greater rotational speed than the axle 11. The driven portion 14 of the variable speed drive may be mounted on a shaft 18 which in turn drives the compressor 1 through the medium of belts 19 interposed between the pulley 20 of the shaft 18 and the pulley 21 of the compressor 10. The condenser fan 5 is also driven by the shaft 18 through the medium of belts 6 which drive the jackshaft 7 which in turn drives the fan 6 through the medium of belts 8. If desired, the shaft 18 may form a portion of the dynamo-electric machine 22 which may be used to drive the compressor at such times when the vehicle is traveling at speeds too slow to properly operate the compressor. The dynamo-electric machine 22 may be used as a generator for charging the battery at such times when the speed of the vehicle is sufficient to properly operate the compressor and generate current.

A variable ratio drive preferably includes frictionally connected rotating parts having variable effective power transmitting diameters and is provided with means for automatically varying these diameters to compensate for variations in the speed of travel of the vehicle. These frictionally connected rotated parts preferably take the form of one or more driving pulleys 23 and one or more driven pulleys 24 between which are placed one or more belts 25. One or more of the pulleys is provided with relatively movable flanges, the relative movement of which varies the effective belt diameter of the pulley or pulleys and thus varies the speed ratio between the axle 11 and the compressor 10.

Figure 6:
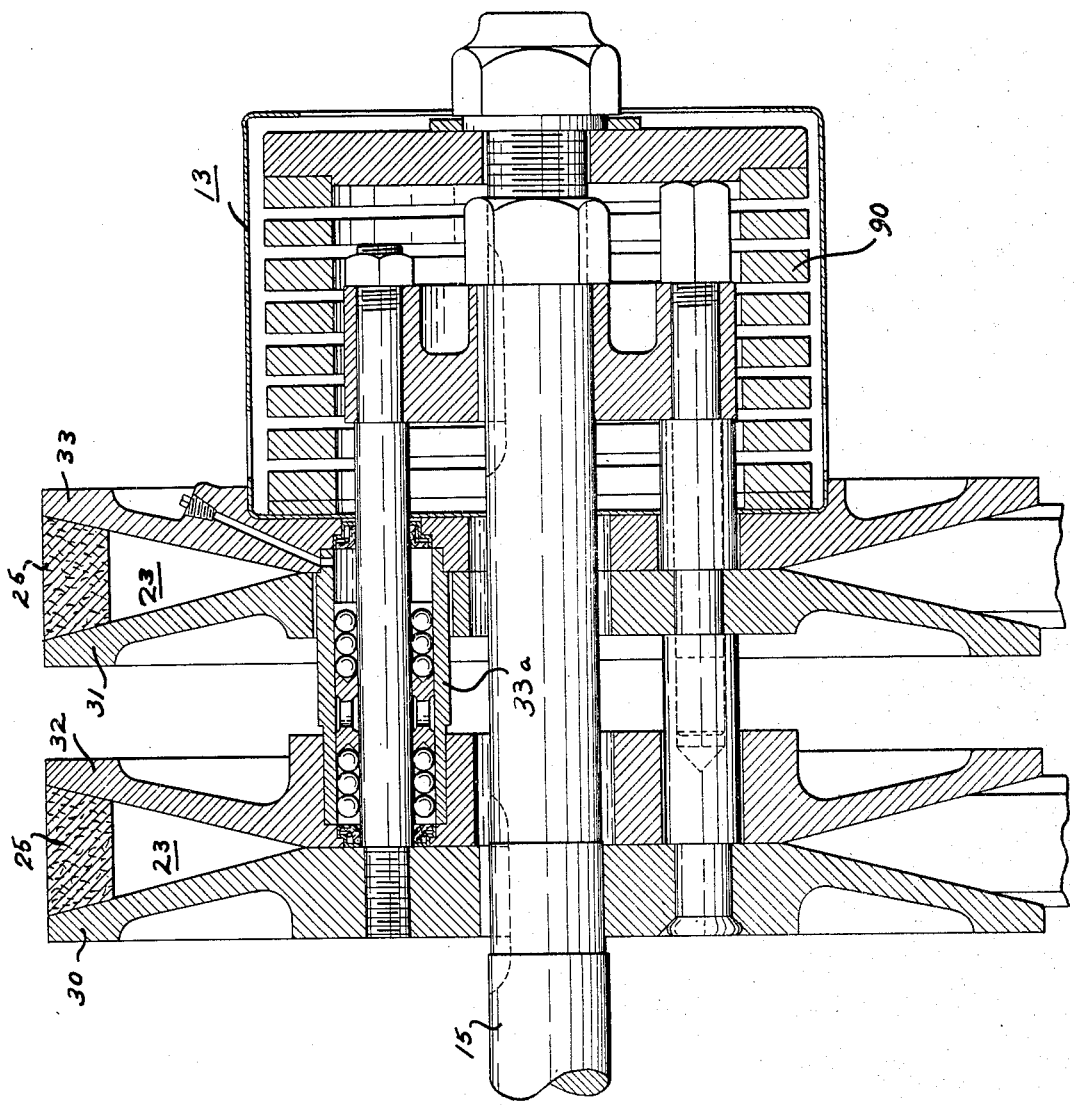
Fig. 6 is a cross sectional view of the driving member of the variable ratio drive.

In the preferred embodiment the driving member 13 includes a pair of pulleys 23, each of which is provided with an axially fixed pair of cone-shaped flanges 30 and 31 and a pair of axially movable cone-shaped flanges 32 and 33. The flanges 30 and 31 are directed in one axial direction and the flanges 32 and 33 are directed in the opposite axial direction, thus to form the V pulleys 23. Means are provided for automatically moving at least one of the pairs of flanges, such as flanges 32 and 33, in a manner to be more fully described, in order to vary the effective belt drive diameter. This variation in diameter causes the belts 25 to ride far out on the pulley as shown in Fig. 6 or nearer towards the center as shown in Fig. 7.

It will be observed that the effective radius of the driving pulleys will be determined by two factors, first, the pressure exerted by the spring 90 and, secondly, by the spreading force exerted by the belts 25. The actual operation of the driving pulley mechanism shown in Figs. 6 and 7 is much the same as the operation of the driving pulleys shown in Figs. 5 and 6 of copending application Serial Number 742,490, filed September 1, 1934. However, the mechanism has been slightly simplified and a different type of spring has been used. The spring 90 biases the flange 30 toward the flange 31 at all times and the spring pressure is just sufficient to maintain the belt 25 properly tight at all times. Movement of the flange 33 imparts a corresponding movement to the flange 32 through the sleeve mechanism 33a which secures the flanges 32 and 33 together. The pulleys 23 are locked to the shaft 15 and rotate in unison therewith at all times.

The driven portion of the variable drive 14 shown more in detail in Figs. 2, 3, 4 and 5 is preferably also provided with a pair of pulleys 24. These pulleys are formed by relatively movable conical flanges somewhat similar to the driving member 13. Thus, axially fixed flanges 40 and 41 are directed in the same general axial direction while the movable flanges 42 and 43 are directed in the opposite direction to form V-shaped grooves or pulleys. The movable flanges 42 and 43 are linked together by means of sleeve elements 80. Here, also, automatic means are provided for causing relative movement between these flanges whereby the belts 25 are caused to move axially inwardly or outwardly to vary the effective belt diameters. In Fig. 2, for example, the belts 25 are shown at the bottom of the grooves formed by the flanges. In Fig. 3 the belts 25 are shown in the outer position in which the effective pulley diameter is the maximum. The arrangement for supporting the flanges constituting the pulleys 24 on the shaft 18 is very similar to the corresponding arrangement used in supporting the pulleys in the mechanism described in said aforementioned copending application. For a more complete description of the general arrangement and operation of the parts, reference is hereby made to said application. However, the arrangement for automatically varying the effective belt diameters of the pulleys is an improvement over the arrangement disclosed in the above mentioned copending application. The means for automatically varying the effective belt diameter of the pulleys preferably is speed responsive in character. Inasmuch as railway vehicles are generally provided with a source of fluid under pressure for operating the brakes, the same supply of fluid under pressure may be used for operating a pneumatic means for varying the effective belt diameters of the pulleys. As shown in Fig. 2 of the drawings, the pulleys 24 are rotatably supported on the main shaft 18. The entire pulley structure is locked to the member 53 and is floatingly mounted on the shaft 18 by bearings 24a and 24b. When the belts 25 move outwardly on the driven pulleys from the position shown in Fig. 2 to the position shown in Fig. 3 the tension on the belts causes them to move inwardly on the driving member 13 from the position shown in Fig. 6 to the position shown in Fig. 7.

In place of using centrifugal devices of the character described in the above mentioned copending application for wedging the driven pulleys 24 together, I have provided a pneumatic means which in turn is controlled by a centrifugal plunger 50 radially disposed in bore 51 provided in the member 52. The member 52 is secured to the clutch plate member 53 and this in turn is non-rotatably secured to the pulleys 24 through the pins 54. The plunger 50 is biased radially inwardly by means of the spring member 55. On the outer end of the plunger 50 is provided a needle member 56 which modulates the flow of fluid through the bleeder port 57. In order to engage the clutch mechanism which comprises the clutch disc 58 and the cooperating clutch plate flanges 59 and 60, compressed air or the equivalent is supplied through the air line 61. A valve 62 may be provided in line 61 to control the flow of compressed air to the clutch. When the valve 62 in line 61 is open the fluid under pressure flows into the chamber 65 via the passage 66. In the event that the fluid pressure in the brake system fluctuates too much a pressure regulating means (not shown) may be provided in the line 61 so as to supply fluid to the pneumatic means at a constant pressure. Air from the chamber 65 is free to flow into the passage 67 which is in communication with the passage 68 leading to the clutch operating chamber 70. Whenever fluid under pressure is admitted to the chamber 70, the clutch operating diaphragm 71 moves the clutch plate 59 to the right as viewed in Fig. 2 whereby the shaft 18 carrying the clutch disc 58 is caused to rotate in unison with the driven pulleys 24. A passage 72 leads from the pressure chamber 70 into the radial bore 51 in which the plunger 50 is mounted. As best shown in Figs. 4 and 5 the shape and the size of the plunger is such that the plunger is free to reciprocate within the bore 51 and also permits the free flow of fluid from the passage 72 to passages 73 and 74 leading to a resilient tube 75 which surrounds the shaft 18 and which is placed between the member 53 and the flange 42 of the pulley 24. The resilient tube 75 comprises an inner rubber or rubber-like casing 76 and an outer protective casing 77 of fabric or the like. At low vehicle speeds when air is supplied to the passage 51 enough air leaks out through the passage 57 to prevent the pressure within the tube 75 from building up enough to inflate the tube. As the speed of the pulleys 24 increases the plunger 50 moves outwardly and begins to restrict the flow of fluid through the port 57 with the result that the pressure begins to build up within the resilient tube 75. As the pressure builds up within the resilient tube 75 this tube expands with the result that the pulley flanges 42 and 43 are shifted longitudinally on the pins 54 thereby changing the effective pulley radius.

In Fig. 3 I have shown the shape which the tube assumes when the vehicle is traveling at such a speed that the plunger 50 has moved radially outwardly to such a position that the needle 56 carried thereby has substantially closed the bleeder port 57. A very slight variation in the speed of the rotating elements of the assembly shown in Fig. 2 causes the position of the plunger 50 to vary and this in turn controls the inflation of the tube 75. This control is very sensitive to speed changes and therefore it is possible to design the parts so as to cause the compressor to operate at substantially constant speed over a wide range of vehicle speeds. It will be understood that passage 57 is sufficiently small to prevent enough fluid to escape therethrough to cause the clutch to disengage, but is large enough to prevent the pressure in the tube 75 from becoming high enough to actuate the pulley flanges 42 and 43. The pulleys 24 are free to rotate relative to the shaft 18 when the clutch is disengaged with the result that the dynamoelectric machine 22 and the compressor 1 do not operate when the clutch is disengaged.

Figure 8:
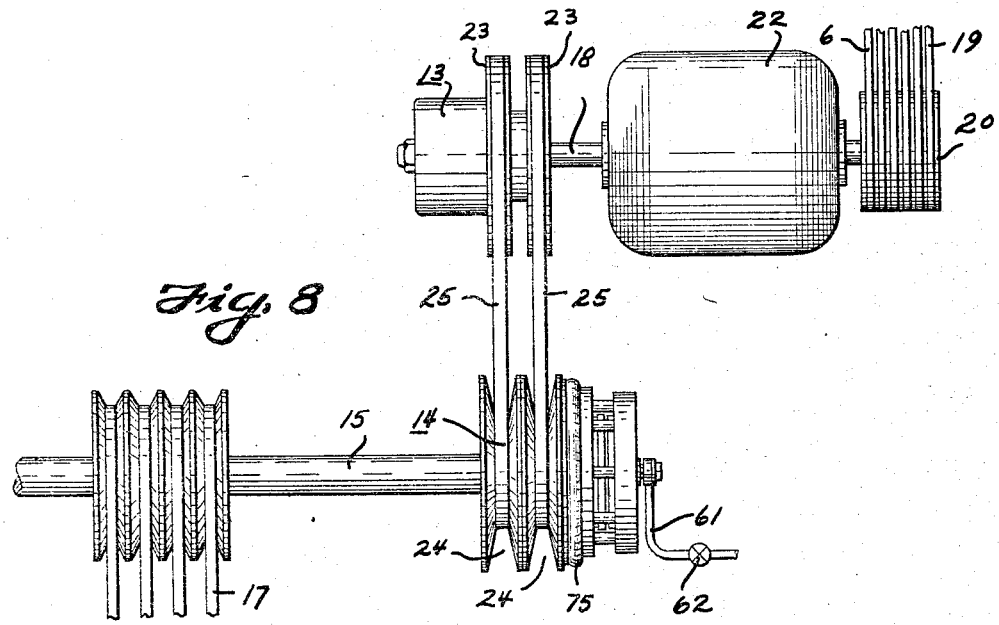
Fig. 8 is a plan view of a slightly different arrangement of the variable ratio drive mechanism.

In Fig. 8 of the drawings I have shown a modified arrangement in which the means for automatically varying the effective belt diameters is mounted on the driving member carried on the jackshaft 15 and in which the driven pulleys are mounted on the shaft 18 of the dynamo-electric machine. In this modification a slightly different speed responsive plunger arrangement is provided since with the speed responsive means mounted on the shaft 15, it is necessary to have the pneumatic tube 75 expand in response to a decrease in speed rather than an increase in speed. In order to accomplish this, the construction of the speed responsive plunger has been slightly changed.

Figure 9:
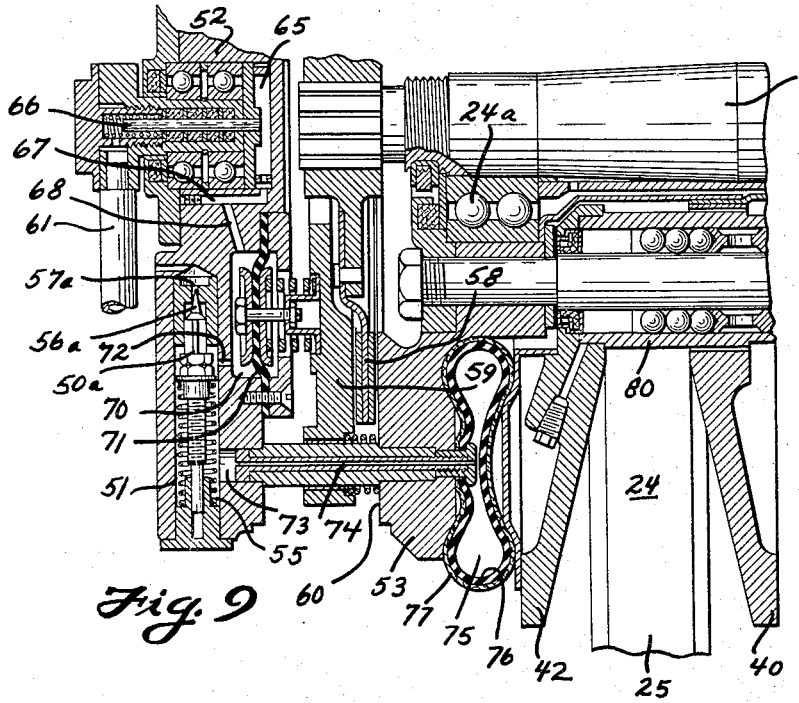
Fig. 9 is a fragmentary sectional view showing some of the details of the variable ratio drive mechanism illustrated in Fig. 8.

Referring to Fig. 9 the plunger 50a which corresponds to the plunger 50 in the other modification is provided with a needle valve member 56a at its inner end which controls the escape of fluid through the bleeder port 57a. The arrangement is such that at slow speeds the plunger is in an inner position whereby the needle 56a fully closes the bleeder port 57a. As the speed of the jackshaft 15 increases, the rotational speed of the plunger 50a increases, and as the speed of the rotating parts increases the needle 56a permits a greater amount of fluid to escape through the port 57a. In other respects the arrangement shown in Figs. 8 and 9 are similar to the arrangement shown in the other figures.

While the form of embodiment of the invention as herein disclosed, constitutes a preferred form, it is to be understood that other forms might be adopted, all coming within the scope of the claim which follows.

What is claimed is as follows:

A variable ratio drive including a driver member, a driven member, means whereby said driver member drives said driven member, means for varying the speed of said driven member with respect to the speed of said driver member, pneumatic means for controlling said last named means, means for supplying fluid under pressure to said pneumatic means, a radially extending bore in one of said members, a plunger slidably mounted in said bore and adapted to slide outwardly in response to centrifugal force, spring means biasing said plunger inwardly, and means whereby movement of said plunger in said bore varies the operation of said pneumatic means so as to vary the speed of said driven member.

HARRY F. SMITH.